(12) United States Patent
Ragonese et al.

(10) Patent No.: US 8,044,538 B2
(45) Date of Patent: Oct. 25, 2011

(54) MULTI-CELLULAR PHOTOVOLTAIC PANEL SYSTEM WITH DC-DC CONVERSION REPLICATED FOR GROUPS OF CELLS IN SERIES OF EACH PANEL AND PHOTOVOLTAIC PANEL STRUCTURE

(75) Inventors: Domenico Ragonese, San Gregorio (IT); Francesco Pulvirenti, Acireale (IT); Natale Aiello, Trecastagni (IT); Nicola Nigido, Aci Catena (IT); Santo Ilardo, Leonforte (IT); Salvatore Di Fazio, Leonforte (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 205 days.

(21) Appl. No.: 12/351,360

(22) Filed: Jan. 9, 2009

(65) Prior Publication Data

US 2009/0179500 A1 Jul. 16, 2009

(30) Foreign Application Priority Data

Jan. 10, 2008 (IT) ............................ VA2008A0002

(51) Int. Cl.
*H02J 1/00* (2006.01)
*H02J 3/00* (2006.01)
(52) U.S. Cl. ...................................................... 307/82
(58) Field of Classification Search .................... 307/43, 307/71, 72, 82
See application file for complete search history.

(56) References Cited

U.S. PATENT DOCUMENTS

2008/0150366 A1* 6/2008 Adest et al. ............... 307/77
2010/0038968 A1* 2/2010 Ledenev et al. ............. 307/82
* cited by examiner

*Primary Examiner* — Jared Fureman
*Assistant Examiner* — Carlos Amaya
(74) *Attorney, Agent, or Firm* — Lisa K. Jorgenson; E. Russell Tarleton; Seed IP Law Group PLLC

(57) ABSTRACT

A photovoltaic energy conversion system includes a distributed control structure for groups of cells of each multi-cellular panel, the components of which are entirely physically integrated in the photovoltaic panel. Each multi-cellular photovoltaic panel has a DC bus, supplied in parallel by a plurality of DC-DC converters, each provided with a controller that controls the working point of the photovoltaic cells coupled to the input of the DC-DC converter for a maximum yield of electric power by implementing a relatively simple MPPT algorithm. The controller includes a logic circuit and A/D converters of analog signals representing the input voltage and the input current generated by the group of cells that is coupled to the input of the DC-DC converter and optionally also of the output voltage of the converter, and a relatively simple D/A converter of the drive control signal of the power switch of the DC-DC converter.

28 Claims, 13 Drawing Sheets

MULTI-CELLULAR PHOTOVOLTAIC PANEL SYSTEM WITH DC-DC CONVERSION REPLICATED FOR GROUPS OF CELLS IN SERIES OF EACH PANEL AND PHOTOVOLTAIC PANEL STRUCTURE

BACKGROUND

1. Technical Field

This invention relates to photovoltaic systems for converting light to electric energy using multi-cellular panels and more particularly to the maximization of the power delivered by each panel.

2. Description of the Related Art

A multi-cellular panel photovoltaic system for converting light to electric energy can be an isolated system (stand alone) with batteries for accumulating energy for delivering electric power even when the panels are not irradiated. In areas where public distribution mains are available, so-called grid-connected systems are preferably used, capable of delivering the electric energy generated to the public distribution mains through bidirectional meters.

Even if the novel system of this disclosure is equally useful for grid-connected systems as well as for isolated systems, the ensuing description and the functional schemes used for illustrating it will refer to the case of a grid-connected system that, as will become clear, employs dedicated safety devices in addition to the core hardware of the conversion system.

Typically, a grid-connected photovoltaic system has a basic scheme as depicted in FIG. 1:

- the photovoltaic panels PV-PANELS are the basic components that convert the light impinging thereon into electric energy;
- the block INVERTER comprises a first input DC-DC converter that stabilizes the voltage generated by the panels. Depending on the type of power plant and on the number of panels connected in series, the converter can be either a "boost" converter (step-up), a "buck" converter (step-down) or a "buck-boost" converter;
- the second block DC-AC represents the output converter that converts the stabilized DC voltage to an AC voltage for transferring the energy delivered by the photovoltaic panels to the electric mains (at the established voltage and frequency);
- the safety device ANTI-ISLANDING CIRCUITRY disconnects the photovoltaic power plant from the mains in case the mains are grounded by accidental cause or for maintenance reasons, for obvious safety reasons;
- the block CONTROL SYSTEM comprises one or more programmable controllers MCU-1 and MCU-2 that may be either common DSP devices or microprocessors μP with the function of:
- executing an appropriate algorithm for calculating the instantaneous power, for tracking the MPPT and controlling the DC-DC converter;
- executing an appropriate algorithm for monitoring and analyzing the mains voltage also for recognizing an eventual significant voltage drop and consequently controlling the DC-AC inverter and mains disconnecting/connecting anti-islanding devices.

MPPT stands for Maximum Power Point Tracking and the results of this algorithm (of which there are various embodiments) determine consequent control signals of the DC-DC converter such that the working point of the photovoltaic panel or panels be kept in the neighborhood of the point corresponding to the maximum deliverable power.

"Anti-islanding" designates a safety system that disconnects the power plant from the public mains in case of failures. The anti-islanding system is composed of devices (switches) that disconnect the power plant and the relative control system based on an algorithm that continuously processes fluctuations of the mains voltage or variations of specific control signals transmitted through the mains for recognizing events of significant voltage drop that may be due to accidental grounding of mains to a deliberate grounding of mains.

Often a sole DSP device or a sole microprocessor μP of appropriate calculation capability may be used instead of two distinct controllers (this possibility is symbolically indicated in the figure by the bidirectional arrow joining the two blocks MCU1 and MCU2).

The commercially available photovoltaic panels differ among them in terms of fabrication technology, physical structure of the photovoltaic semiconductor junction, materials that determine conversion efficiency, power/area ratio and, obviously, cost.

Only for sake of example, the ensuing description will refer to a domestic power plant of about 3 kW, though the same considerations apply to power plants for different applications and of any different power rating.

In order to cover the power requirements of a household (about 3 kW), and considering the yields of nowadays commonly marketed panels, about twenty panels may be required.

Generally, photovoltaic plants can be realized by connecting the panels according to three different schemes:

- "single stage", wherein all the panels of the plant are connected in series and there is a single electrical regulation and conversion sub-system that carries out both the DC-DC function as well as the DC-AC function;
- "dual stage", wherein all the panels are connected in series to a single DC-DC converter that, on its turn, has a DC-AC connected in cascade;
- "multi stage", wherein the panels are grouped into a plurality of groups of panels, each group of panels being connected to a DC-DC converter and on their turn the outputs of all the distinct DC-DC converters are connected in parallel to the input of a single output inverter DC-AC.

The cost of the photovoltaic panels remains by far the largest contribution to the total cost of the photovoltaic plant.

A way of reducing the cost of an installation is desirable to reduce the number of panels to be installed though guaranteeing the rated power of the power plant.

This objective may be pursued by enhancing the efficiency of each panel for increasing the power that may be delivered at the same irradiation conditions.

Each panel is characterized by a family of V-I characteristics that illustrate the performances for different irradiation conditions. FIG. 2 reproduces a family of curves of a common photovoltaic panel currently marketed.

FIG. 3 is a graph of the power delivered by the panel in function versus the voltage at its terminals, and the maximum power point (MPP) is highlighted.

In order to maximize the power deliverable by the panel, the system should ensure at any time that the panel(s) work in the neighborhood of the working point of its characteristic at which the delivered power is maximized (MPP).

By connecting in series all the cells of the array to the terminals of the panel, there are potential problems: if one or more cells of a panel are for some reason significantly less illuminated than the other cells, the whole series of panels would be limited to work at the current imposed by the underexposed cells; in the case of failure of one or more cells or of their complete obscuration, interruptions may take place (i.e., an open circuit may occur in the current path of the DC source represented by the panel).

In order to lessen the effects of accidental current limitations and/or interruptions, the array of cells of each panel has one or more bypass diodes that, properly connected between the different nodes of the string of cells in series, provide unimpeded alternative current paths to those across one or more cells that may be severely underexposed (obscured) or damaged. Bypass diodes are usually installed in a so-called "junction box" of the panel that houses the terminals for electrically connecting the panel.

In the example shown in FIG. 4, there are three bypass diodes (D1, D2 and D3) and the cell with a cross sign is supposed to be obscured or damaged. Without the diode D1, the highlighted cell would interrupt the current generated by the string of cells of which is part (and eventually current coming from another panel connected in series through the terminal "−" of the panel). The presence of the other diodes D2 and D3 is irrelevant if the other cells of the panel are exposed to a normal irradiation.

In the "single-stage", "dual-stage" and "multi-stage" arrangements, connection in series of the panels allows at most (for the "multi-stage" structure) the maximization of the power extracted by a string of panels.

According to the system architectures offered on the market, such a maximization is achieved through an algorithm, known by the acronym MPPT (Maximum Power Point Tracking), usually implemented via software and executed by a programmable device such as a digital signal processor (DSP) or a micro-controller (µP).

Depending on the calculation power, the same device (indifferently a DSP or a µP) may perform a centralized management of the whole system. The control circuits of the DC-DC stabilization converter, of the output DC-AC inverter and eventually of the disconnection/connection devices from the public grid of the "anti-islanding" circuitry may be managed by a single DSP or µP of appropriate calculation capability.

According to known architectures, the DC-DC converter or converters if more than one, the output DC-AC inverter and the eventual connection/disconnection circuitry of the "anti-islanding" system are conveniently housed in a central appliance, normally installed at distance from the photovoltaic panels (often close to the bidirectional counter of the mains operator) that includes also a single or two programmable control blocks, indifferently whether they are DSP or µP and eventually also related programming and/or setting interfaces.

Centralization of the management of working point control for maximum power yield of the photovoltaic plant requires necessarily the use of a central processing unit, indifferently a DSP or a µP, capable of executing the numerous calculations contemplated by a relatively complex control algorithm, in order to monitor continuously the electric power being yielded by the panels and consequently intervening, through digital control signals, on the functioning parameters of the DC-DC converters for regulating the DC voltage being converted to an AC voltage.

Obviously, monitoring of voltages as part of input variables and actuating control adjustments includes input and output interfaces of signals with appropriate A/D and D/A converters.

The cost of such a central control and conversion appliance is not negligible.

Moreover, control of the working point of the photovoltaic cells of the panels for enhancing power yield of a photovoltaic energy conversion of plant as implemented nowadays is an operation the effectiveness of which is only partially exploited.

BRIEF SUMMARY

The applicant has devised an innovative structure that significantly enhances the effectiveness of the control of the working point toward a feasible maximization of the electric power yield of a photovoltaic energy conversion plant and, on another account, considerably simplifies the MPPT control hardware, making no longer necessary the use of a programmable and processing unit (DSP or µP) and of the related auxiliary circuitry (I/O interfaces, programming and/or setting interfaces, RAM resources, and the like).

Basically, the novel conversion system of this disclosure contemplates a distributed control structure for groups of a limited number of cells of each multi-cellular panel, the components of which are entirely physically integrable in the photovoltaic panel. Therefore, the centralized part of the photovoltaic energy conversion plant may, in the case of a grid-connected system, comprise solely an inverter (DC-AC converter) and a connection/disconnection circuit and related anti-islanding control (that would also be unnecessary in case of a stand-alone or isolated conversion plant).

Each multi-cellular photovoltaic panel has a DC bus, supplied in parallel by a plurality of DC-DC converters, each provided with control means of the working point of the photovoltaic cells coupled to the input of the dedicated DC-DC converter for a maximum yield of electric power in the form of a logic circuit implementing a relatively simple MPPT algorithm. These control means can be realized with a relatively simple logic circuit and as many relatively simple A/D converters of at least analog signals representing the input voltage and the input current generated by the group of cells in series that is coupled to the input of the DC-DC converter and optionally also of the output voltage of the converter, and a relatively simple D/A of the drive control signal of the power switch of the DC-DC converter.

Each DC-DC converter has its input connected to a string of a certain number of photovoltaic cells in series of the whole set of cells that compose the array of photovoltaic cells of the multi-cellular panel.

According to this disclosure, the tracking of the working point of the cells for maximum power yield is carried out on distinct groups of a limited number of cells of a multi-cellular panel and it is outstandingly effective because of the fractional size of the light capturing area of a panel on which the optimization control is executed on one hand, and, on the other hand, because such a grained MPPT control may be implemented with an extremely simple circuit and less expensive means. Pluralities of significant MPPT control currents are integrable in a monolithic device, the replication of the same circuit for managing all the groups of cells of the panel according to the above discussed grouping and replication of DC-DC converters.

Indeed, the cost for replicating and integrating in each photovoltaic panel numerous DC-DC converters and respective MPPT control circuits favorably compares with the cost of implementing the equivalent functions with a much more complex centralized system as it is done in prior art photovoltaic conversion panels.

The overall cost of the novel architecture of the applicant is further contained because the intrinsic diode of an integrated structure of the power switch of each DC-DC converter incorporated in the panel and the output diode that is commonly present in each DC-DC converter, at the input of which a certain number (groups) of cells in series are connected, may advantageously function as by-pass diodes for the group of cells in series coupled to the input of the DC-DC converter.

The terminals of the DC bus of each panel can thus be normally connected according to any design series/parallel scheme of interconnection to terminals of other panels, finally to an input of the power inverter (DC-AC) of the photovoltaic conversion plant.

Incorporation in each panel of a plurality of DC-DC converters, each with its own circuit for controlling the working point of the group of cells in series coupled to the input of the DC-DC converter for maximum power yield, can be easily realized on a printed circuit board that can be accommodated in the so-called "junction box", normally present on the rear of a photovoltaic panel for hosting also the terminals (negative and positive) of the DC bus of the panel for connecting with corresponding terminals of all the other panels according to a series-parallel interconnection design scheme and finally to the input terminals of the inverter.

The above figures have only illustration purposes and must not be intended as limiting the exemplary embodiments of the invention herein disclosed.

DETAILED DESCRIPTION

In particular, in the exemplary embodiments described, a step-up or boost DC-DC converter is used for stabilizing the generated voltage though any other topology of DC-DC converter can be used such as a buck-boost converter or even a step-down converter.

Figure 1:
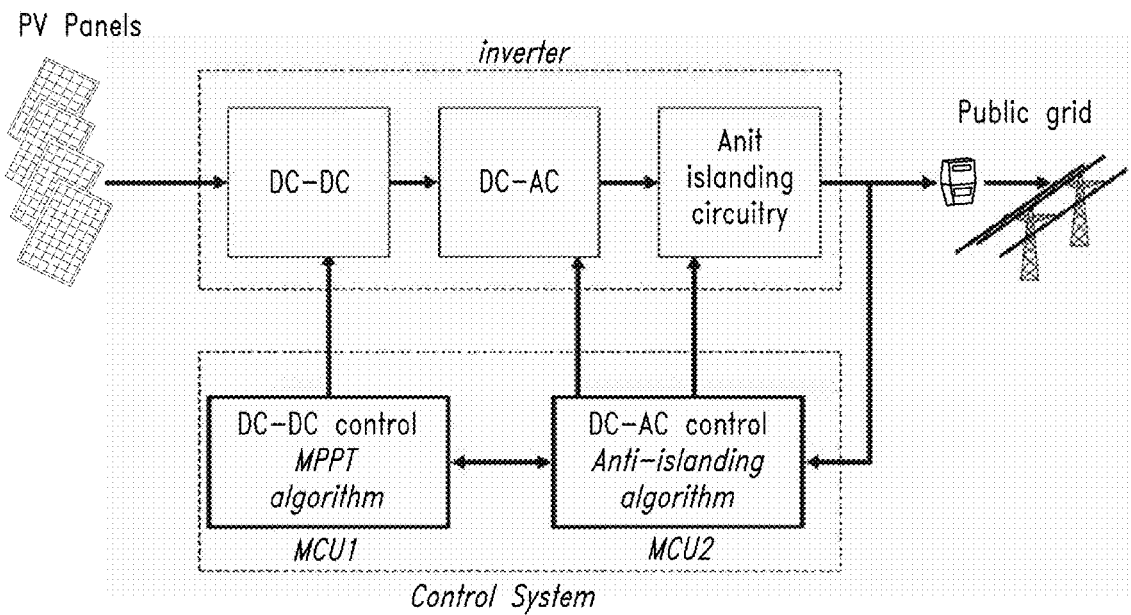
FIG. 1, already discussed above, depicts a typical architecture of a photovoltaic grid-connected conversion system.
Figure 2:
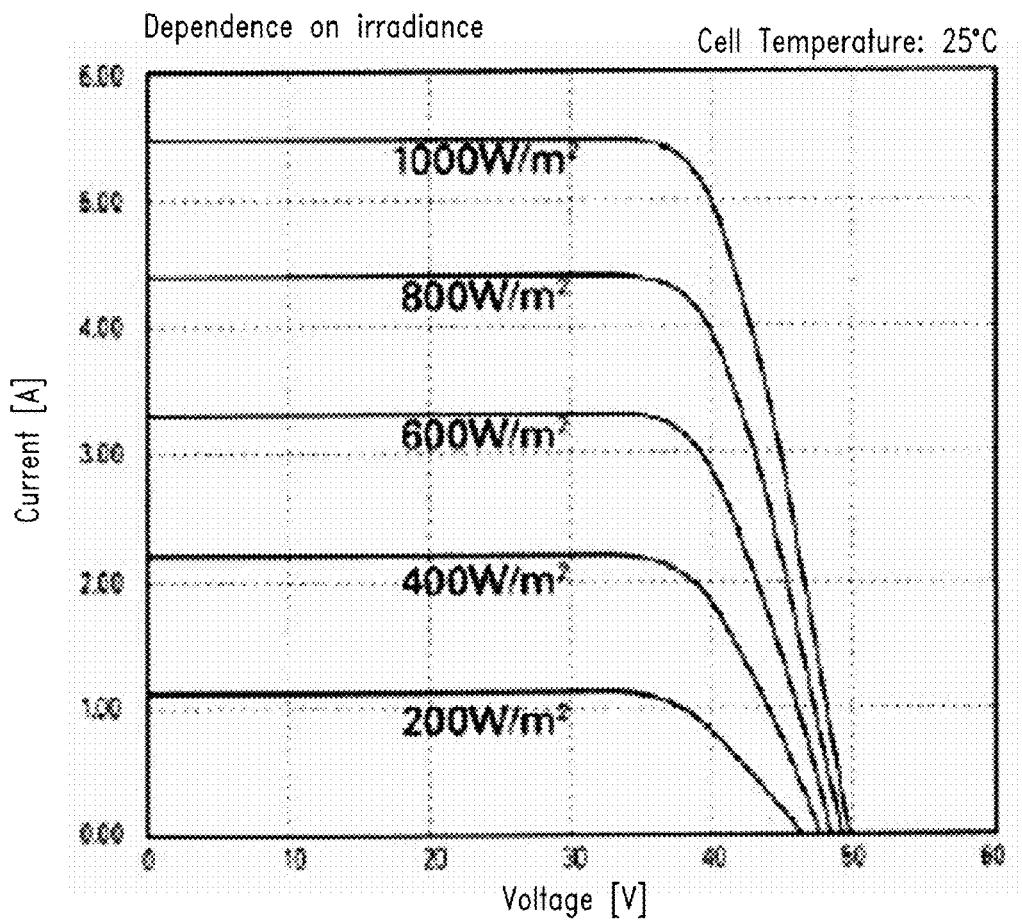
FIG. 2 is a typical graph of a family of V-I curves for different irradiation conditions of commonly available panels.
Figure 3:
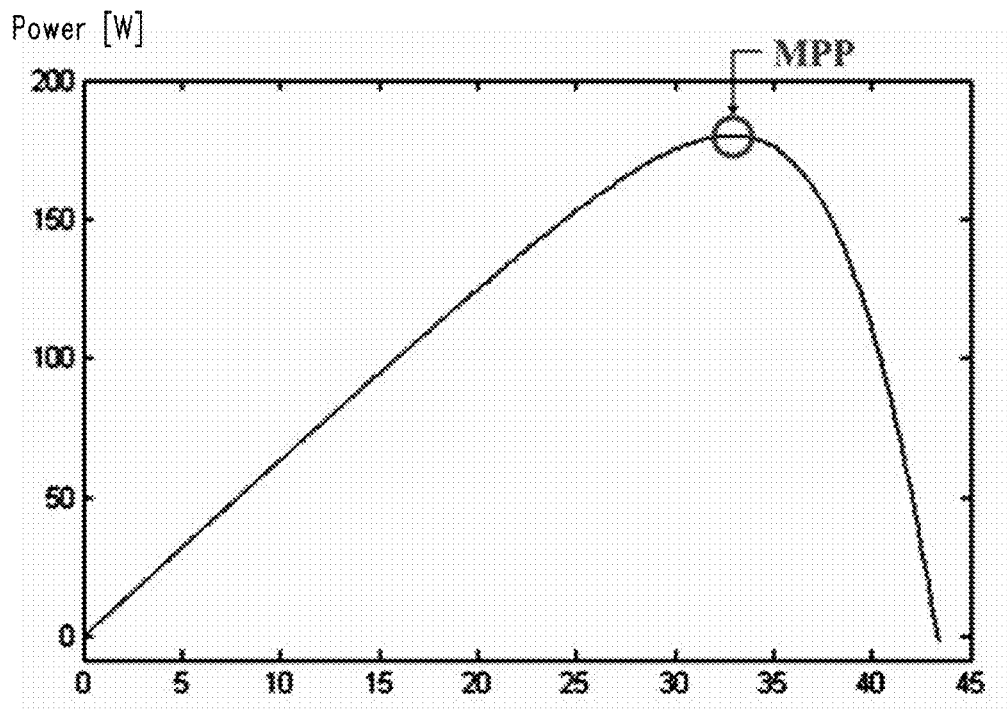
FIG. 3 is a characteristic curve of the power (V*I) that may be delivered by a panel at a given irradiation condition versus the DC voltage on the terminals of the photovoltaic panel.
Figure 4:
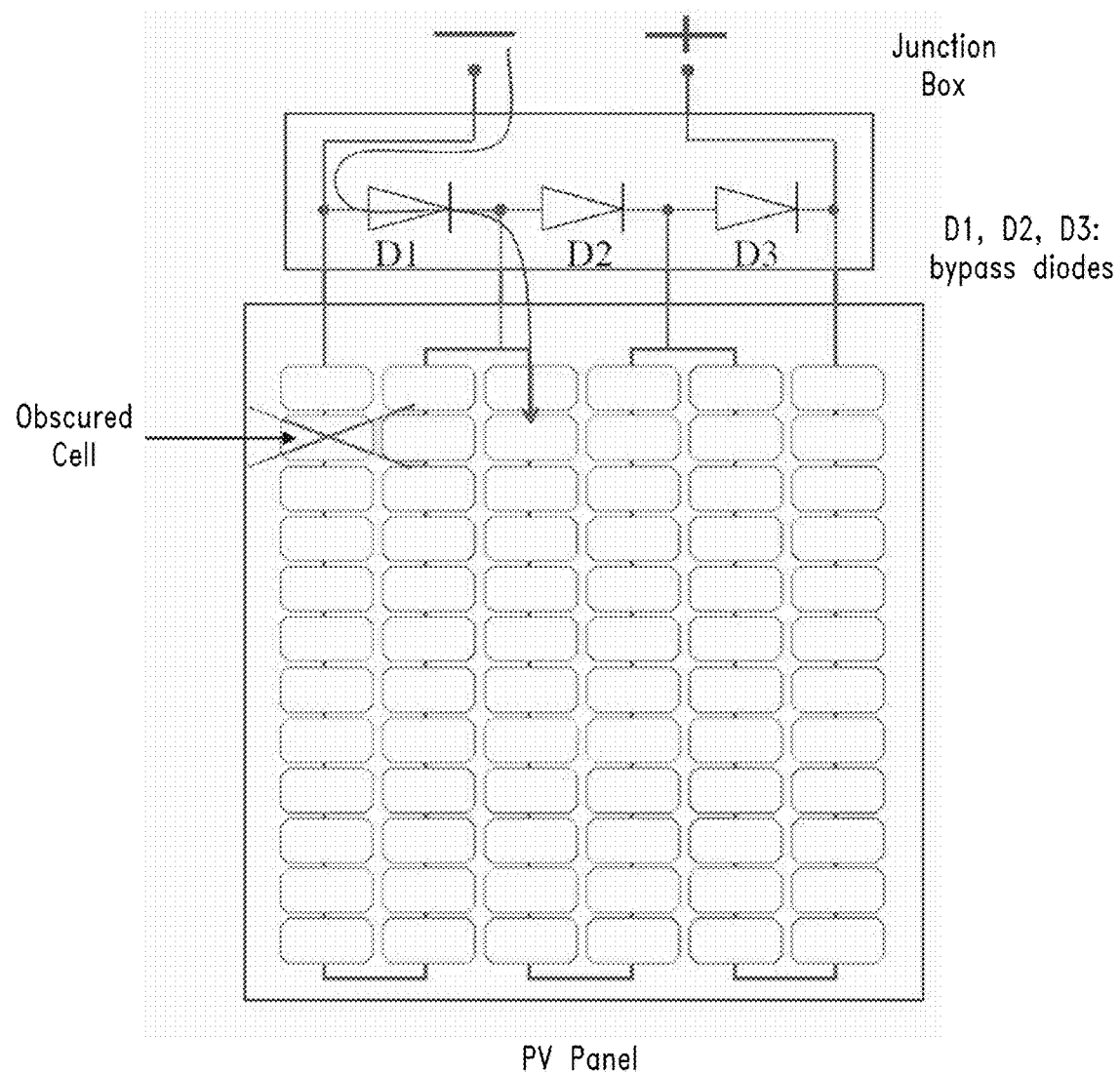
FIG. 4 illustrates the use of by-pass diodes for by-passing strings of cells of multi-cellular panel.
Figure 5:
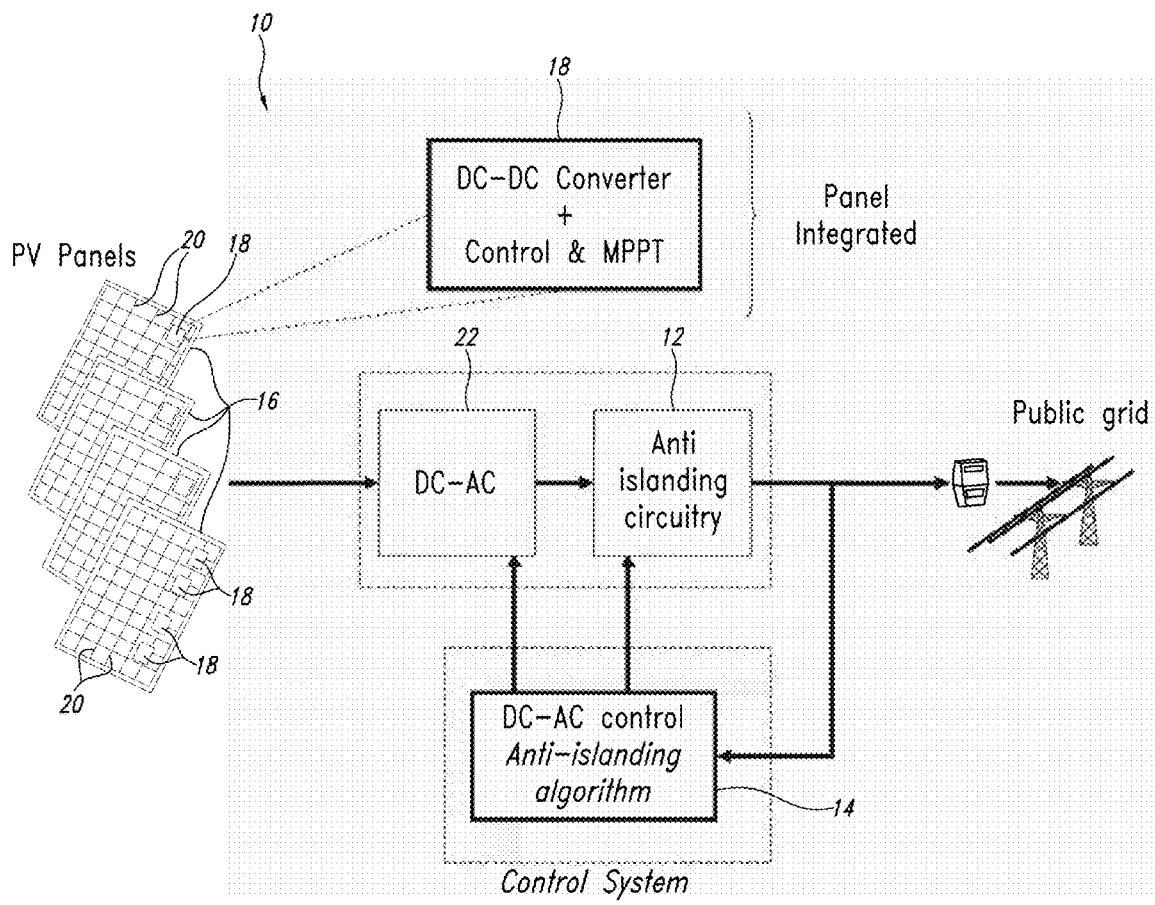
FIG. 5 is a basic architecture of a photovoltaic conversion system according to an embodiment, for a grid-connected application.

FIG. 5 shows a general block diagram of a photovoltaic conversion system 10 according to this disclosure for a grid-connected application. The system 10 includes an anti-islanding circuit 12 having connection/disconnection switches for connecting and disconnecting the system 12 from the public electricity grid under the control of a control circuit 14. The portion of the control block 14 that controls the anti-islanding system and the related connection/disconnection switches of the anti-islanding circuit 12 are accessory and unessential features of the photovoltaic conversion system.

FIG. 5 highlights a feature of the novel photovoltaic conversion system 12 employing one or more multi-cellular panels 16 that incorporate a plurality of DC-DC converters 18 for stabilizing the voltage generated by a string of a certain number of cells 20 of the panel, each including a limitation and MPPT control circuit. A centralized block basically composed of a DC-AC converter 22 outputs electric energy generated by the photovoltaic system and is controlled by the control circuit 14.

Figure 6:
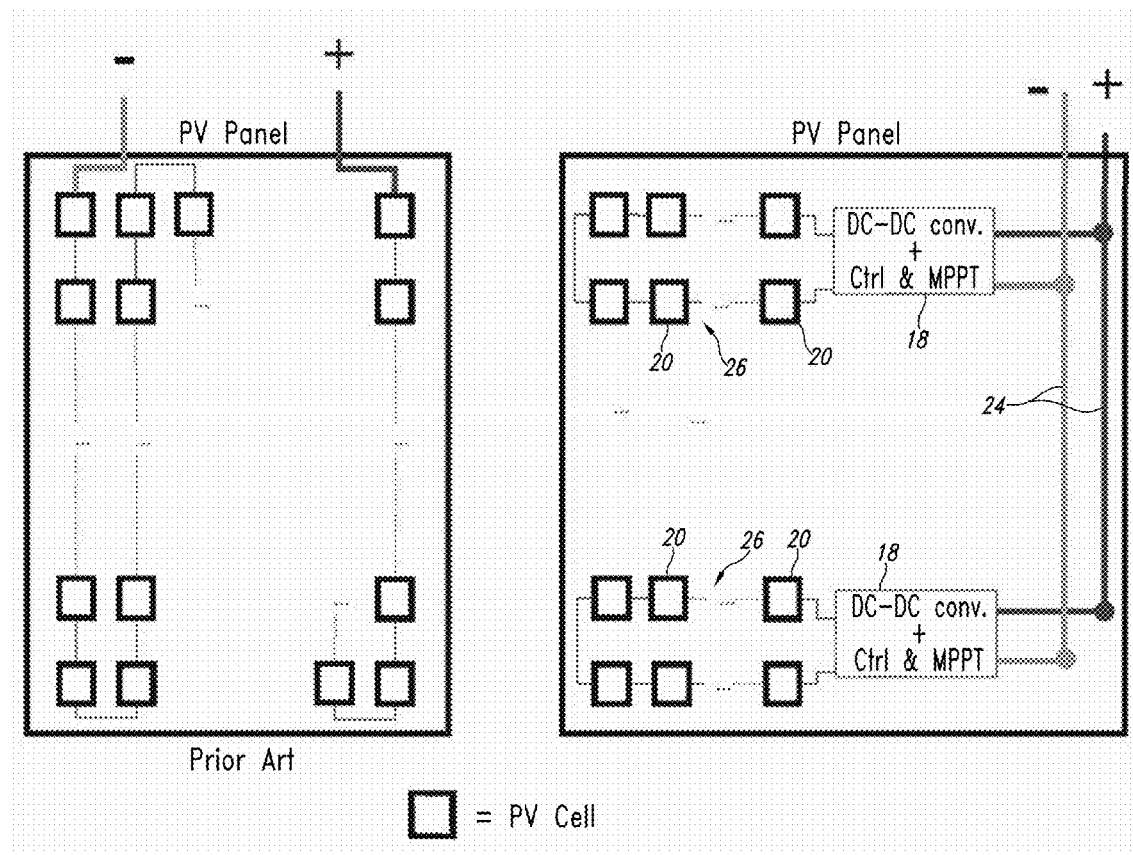
FIG. 6 compares the common structure of a photovoltaic panel to the novel structure of a photovoltaic panel according to this disclosure.

FIG. 6 shows for comparison purpose, the traditional structure of a multi-cellular photovoltaic panel (A) and of a photovoltaic panel 16 realized according to this disclosure (B).

Instead of commonly connecting in series all the cells of the panel to the terminals of unregulated DC voltage as generated by the multi-cellular panel depending on the illumination level of its light sensible area, the multi-cellular panel 16 of this disclosure has a DC bus 24 that connected between the connection terminals (negative and positive) and the plurality of DC-DC converters 18 of the panel 16. Each DC-DC converter 18 converts an unregulated voltage produced by a string 26 of cells 20 coupled to the input of the converter, and includes a control circuit that controls the working point for maximizing yield.

Grouping of the cells that form the whole multi-cellular array of the active surface exposed to light of a photovoltaic panel can be designed according to a cost optimization analysis and will generally depend on the cell area size and total sensitive area of the panel. The number of groups of cells and of the relative converters may vary from at least two or three up to six or even more groups per panel.

Figure 7:
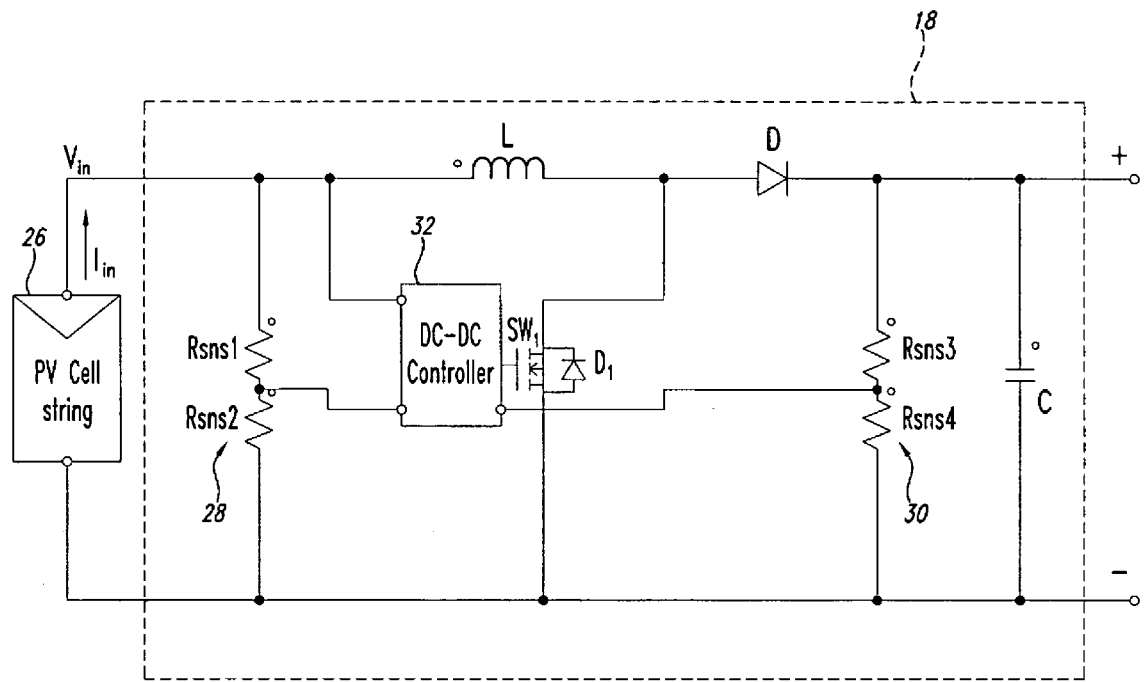
FIG. 7 is an embodiment of the electric circuit of the DC-DC converters integrated in each photovoltaic panel according to this disclosure.

FIG. 7 illustrates a basic circuit diagram of one of the DC-DC converters 18 according to one embodiment. The DC-DC converter 18 is a DC-DC step-up or boost converter connected to a string 26 of cells of a photovoltaic panel 16. The circuit diagram depicts input and output voltage dividers 28, 30 composed respectively of the resistors Rsns1-Rsns2 and Rsns3-Rsns4, a power switch $SW_1$, a diode $D_1$ (an intrinsic diode of the power switch $SW_1$ if the power switch is an integrated switch or a dedicated recirculation diode if the power switch is a discrete component), a DC-DC controller 32, an inductor L for storing and thereafter delivering energy, an output diode D and an output filter capacitor C. The DC-DC controller 32 applies an appropriate control signal $V_{SW}$ to the insulated gate of the switch $SW_1$.

The DC-DC CONTROLLER 32 comprises the circuitry for implementing the MPPT control for optimizing power yield and eventually the output DC voltage output according to different possible embodiments, some of which will be illustrated hereinafter.

Figure 8:
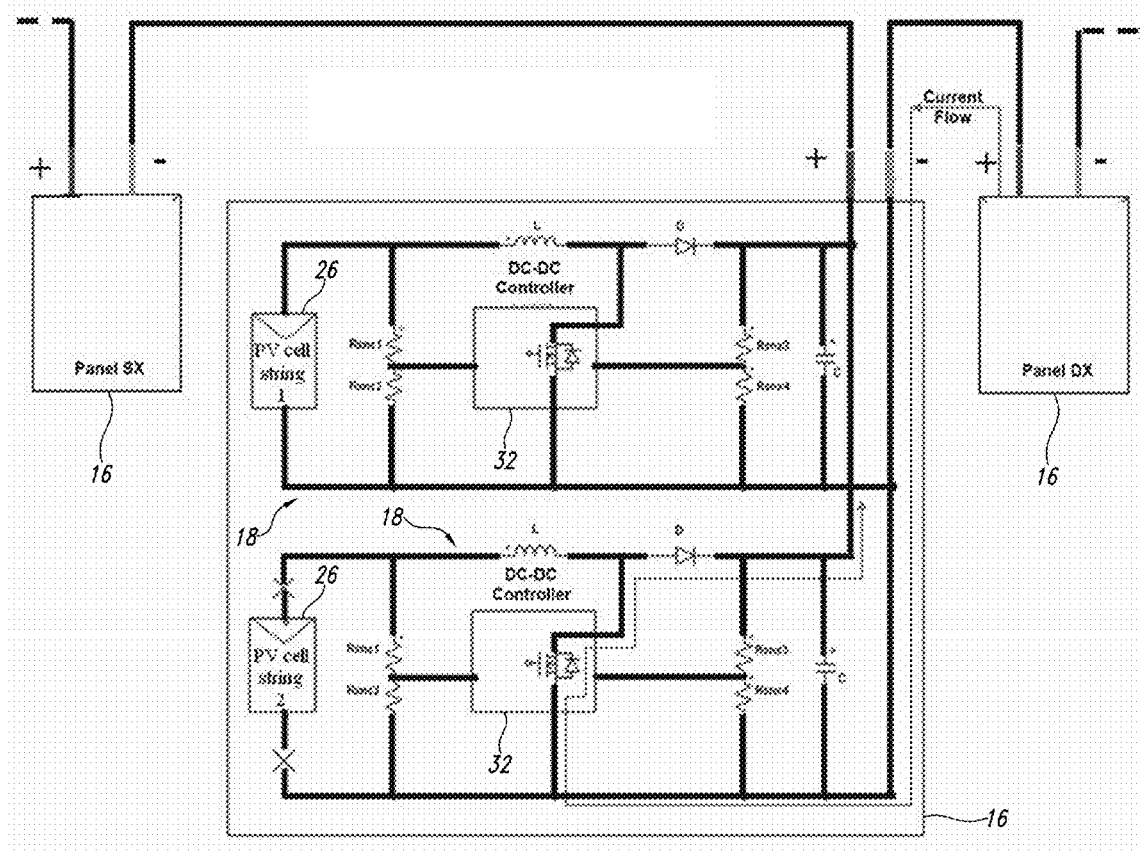
FIG. 8 highlights how the series of the intrinsic diode D1 of the MOS SW1 and of the diode D present in each DC-DC converter of a panel will eventually function as by-pass diode of the respective group (string) of cells coupled to the input of a converter.

FIG. 8 depicts three photovoltaic panels 16, connected in series, of a photovoltaic plant. For the central panel 16 of the three in series, details of its internal circuit show the presence of two identical DC-DC converters 18 with output nodes connected in parallel to the DC bus 24 of the panel, each converter being powered by a respective group or string 26 of cells connected in series PVSTRING1 and PVSTRING2.

The current path through the central photovoltaic panel 16, in case of an accidental shadowing of all or of few of the cells of the second group PVSTRING2, is indicated by the faint arrow line.

The intrinsic diode $D_1$ of the power switch $SW_1$ of the respective DC-DC converter of the second group of cells in series, PVSTRING2, and the output diode D of the same converter 18 allow the flow of electric current, notwithstanding that individual cells 20 or even all of them be in a high impedance state, by providing a by-pass path of the string PVSTRING2 of cells in series containing one or more inactive cells because of failure or shadowing.

In practice, a plurality of on board distinct DC-DC voltage converters 18 coupled to respective groups 26 of cells 20 of the multi-cellular panel 16, provide also for the function of by-pass diodes that are installed in prior art panels for restricting the effect of localized failures and/or shadowing or one or more cells or of a portion more or less extended of the light-capturing area of the multi-cellular panel corresponding to a certain group of cells of the array of the panel.

Figure 9:
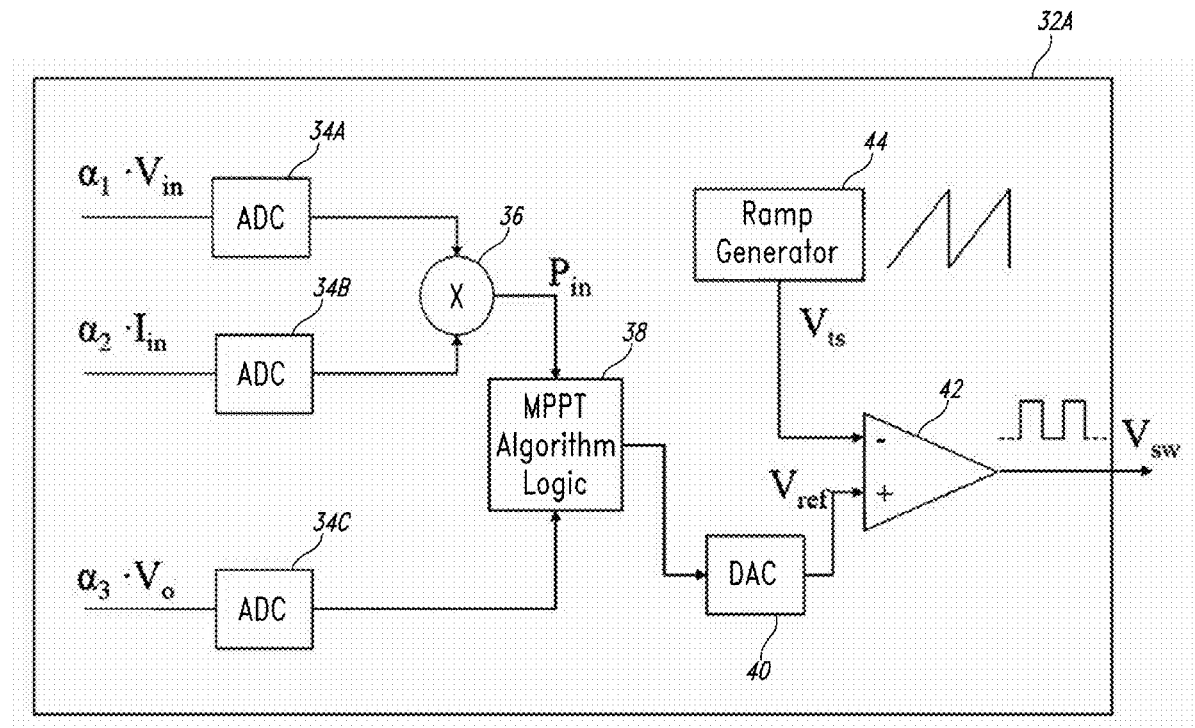
FIG. 9 shows an embodiment of a basic circuit diagram for generating an appropriate control signal of a DC-DC converter of a panel.

FIG. 9 is a detailed functional diagram of the a first embodiment 32A of the DC-DC controller 32 of the circuit diagram of FIG. 7 that incorporates also a logic circuit for implementing a simple though effective MPPT control algorithm.

The DC-DC controller 32 of the DC-DC converter 18 monitors the input voltage ($V_{in}$) and the input current ($I_{in}$), properly scaled by factors $\alpha_1$ and $\alpha_2$ (for example at the input voltage divider 28), generated by the string 26 of cells in series connected to the input of the integrated DC-DC converter. The monitored values are converted by respective ADC converters 34A, 34B and multiplied by a multiplier 36 for obtaining a digital value of the instantaneous power ($P_{in}$) produced by the string of cells in series.

The digital value of the instantaneous power is read by the logic circuitry 38 that executes the MPPT algorithm, in the considered embodiment together with an instantaneous digital value of the output voltage ($V_o$) of the DC-DC converter. The instantaneous digital value of the output voltage $V_o$ is produced by another ADC converter 34C from a monitored analog value of the output voltage $V_o$, scaled by a factor $\alpha_3$ (for example at the output voltage divider 30).

The logic block 38 of execution of the MPPT algorithm generates a digital control signal that, converted by a DAC 40, is applied as reference analog signal $V_{ref}$ to the non-inverting input of a comparator 42 the inverting input of which receives a saw-tooth analog signal $V_{ts}$, generated by a dedicated ramp generator 44. The comparator 42 compares the input signals and generates the analog control signal $V_{sw}$ that may directly drive the control gate of the switch $SW_1$ of the DC-DC converter 16 (re.: FIG. 7).

According to the embodiment shown, the signal $V_{sw}$ that controls the power switch of the converter is substantially a square wave the duty-cycle of which depends from the result of comparing the fixed frequency ramp ($V_{ts}$) with the reference level ($V_{ref}$) generated by the MPPT algorithm logic 38.

According to this embodiment, a PWM mode control with fixed frequency and variable duty cycle is implemented.

In the illustrated example, the monitoring of the output voltage ($V_o$) allows to carry out a hierarchically superior control of the DC-DC converter, for example by imposing that the duty cycle be limited such to ensure that the output voltage does not overcome a pre-established threshold ($V_{o-th}$). This threshold can be established in function of the characteristics of the single cells and of the number of cells connected in series to the input of the DC-DC converter.

For example, supposing of connecting twelve cells in series, the voltage on the terminals of the string would be of about $V_{in}$=6V.

Using a boost converter and imposing an output voltage of $V_o$=20V, the converter would work with a limit duty-cycle of about 70%.

As an option, it is also possible to establish a further safety threshold for the output voltage ($V_{o-max}$) for example 10% larger that the fixed nominal value, upon the attaining of which the converter is automatically turned off.

Of course, control of the power switch of the DC-DC converter, can also be realized differently from that described referring to the scheme of FIG. 9.

Figure 10:
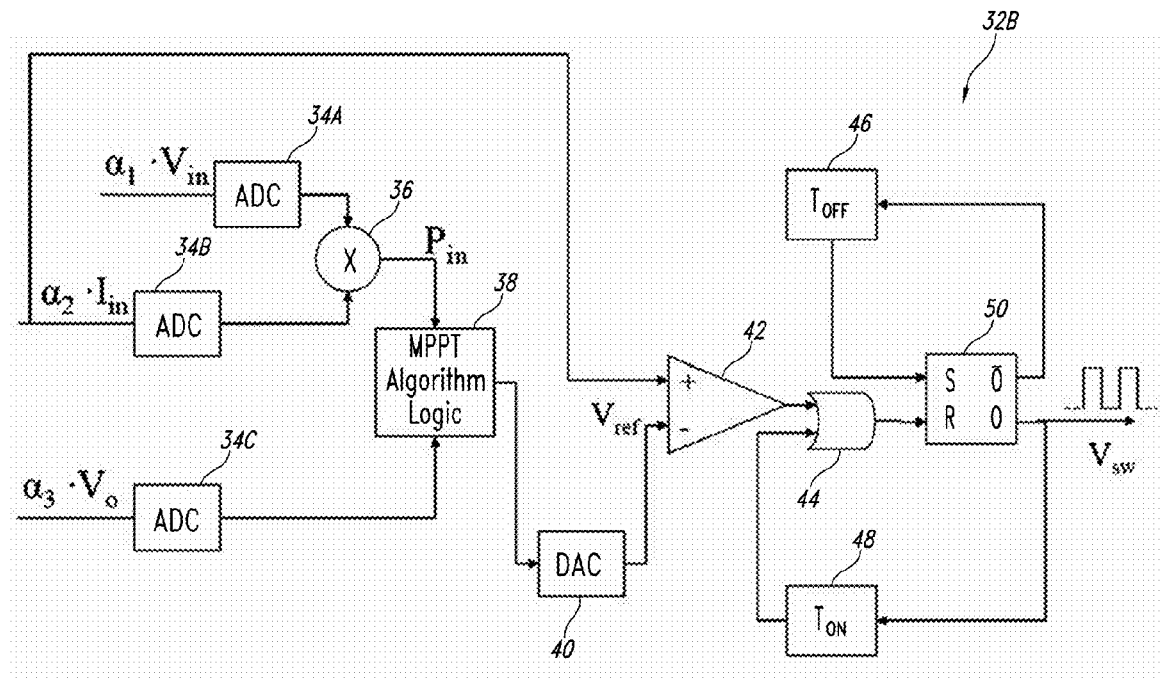
FIG. 10 illustrates an alternative embodiment of the control circuit for a DC-DC converter of a panel.

FIG. 10 depicts an alternative embodiment 32B of the DC-DC controller 32 wherein a current limitation level is varied instead of the duty-cycle.

According to the illustrated alternative output logic circuit, the turn off time ($T_{off}$) of the switch $SW_1$ of the converter 18 is fixed and the turn on time ($T_{on}$) is regulated in function of two variables:
the digital control value generated by the control algorithm and converted to the analog reference signal $V_{ref}$ that is applied to the inverting input of the comparator; and
the current absorbed by the string of cells in series flowing through a sense resistor purposely connected in series to the switch of the converter.

The control algorithm may impose that the current flowing through the power switch of the converter be progressively brought at a certain pre-established level controlled by the MPPT algorithm corresponding to the working point at which the maximum power is yielded.

According to the diagram of FIG. 10, a PWM mode control of the power switch $SW_1$ of the converter 18 takes place at a variable frequency, because the sum of the times $T_{on}+T_{off}$ is variable. The logic circuitry downstream the comparator 42 of the scaled signal of the instantaneous current ($\alpha_2 I_{in}$) and of the analog control signal ($V_{ref}$), is composed of an OR gate 44, of timers 46, 48 for setting the respective times $T_{off}$ and $T_{on}$ and of an output flip-flop 50 is of immediate comprehension.

Figure 11:
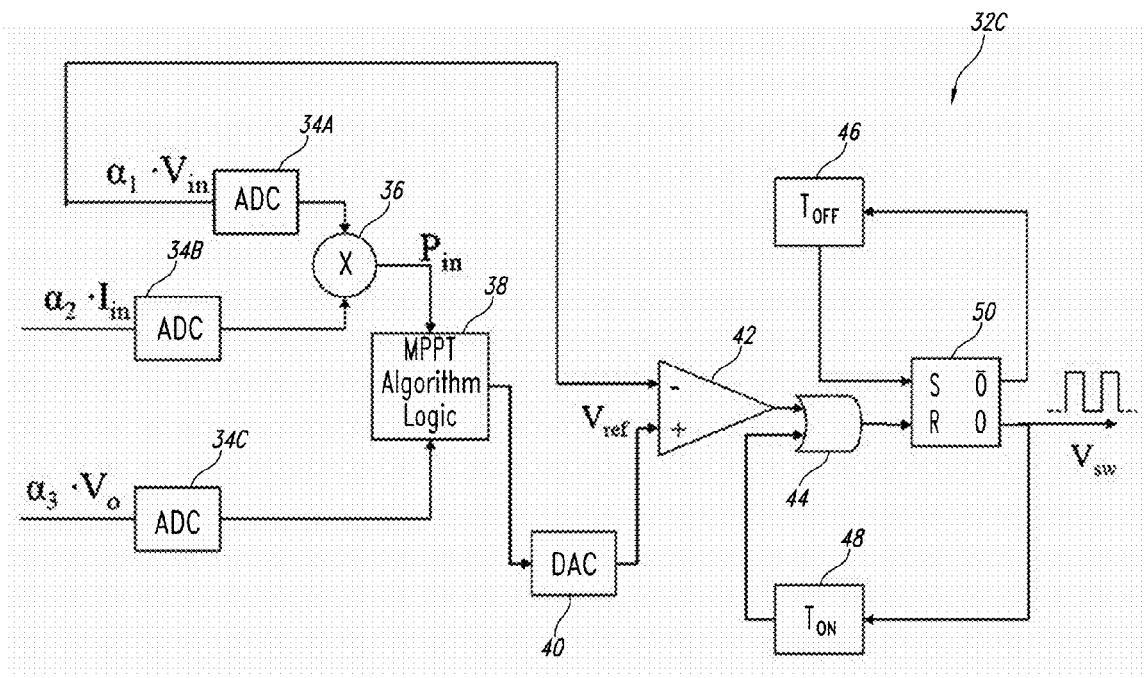
FIG. 11 illustrates another possible embodiment of the control circuit for a DC-DC converter of a panel.

FIG. 11 depicts the basic diagram of a DC-DC controller 32 of the DC-DC converter according to a further alternative embodiment 32C adapted to perturb the input voltage of the converter, in other words the unregulated output voltage of the string of cells in series.

Even according to this alternative embodiment, the turn off time ($T_{off}$) of the power switch $SW_1$ of the converter 18 is fixed and its turn on time is determined by two factors:
the digital control value generated by the control algorithm and converted to the analog reference signal $V_{ref}$ that is provided to the non-inverting input of the comparator; and
the input voltage corresponding to the sum of the voltages generated by the cells of the string of cells in series connected to the input of the DC-DC converter.

The implemented rule may impose that the input voltage ($V_{in}$) be progressively brought to a certain pre-established level controlled by the MPPT algorithm (by adjusting the reference $V_{ref}$ corresponding to the analog value of the digital control value generated by the block MPPT ALGORITHM LOGIC and converted by the DAC) for tracking the working point corresponding to the maximum power yield.

Even in this case, the PWM control of the power switch takes place at a variable frequency because the sum of $T_{on}+T_{off}$ is variable.

Figure 12:
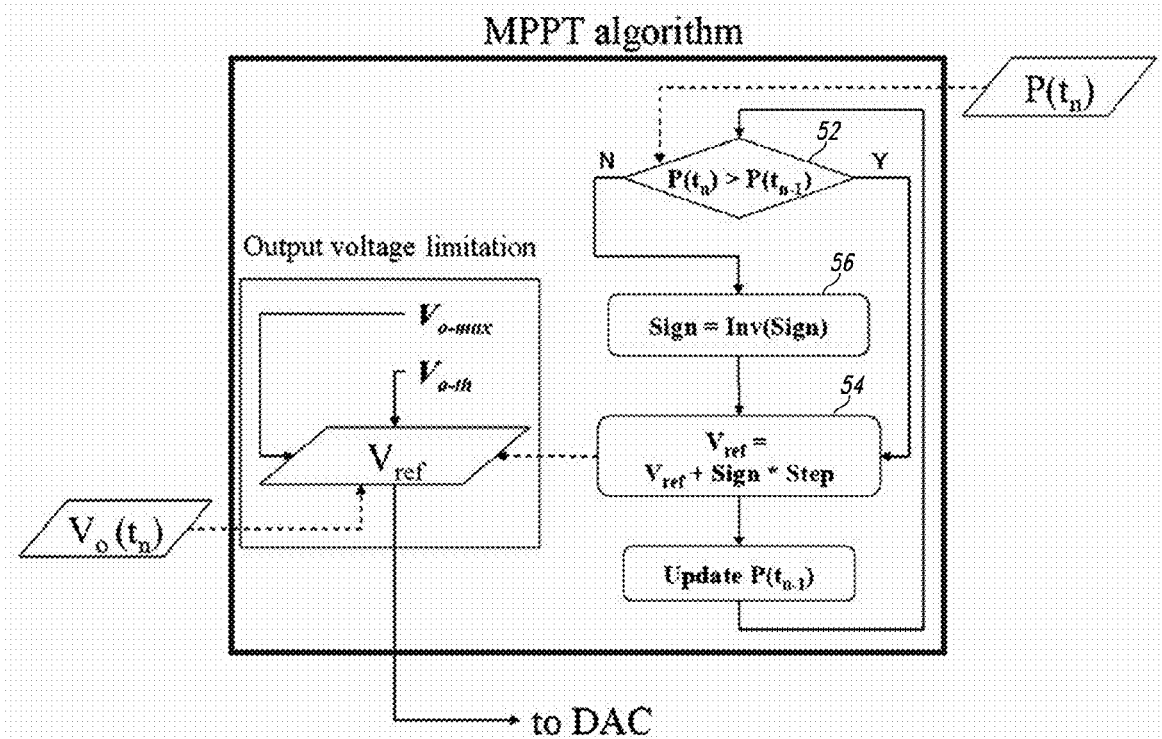
FIG. 12 illustrates the algorithm that is executed by the circuital block MPPT ALGORITHM LOGIC of the circuit diagrams of FIGS. 9, 10, and 11, according to an embodiment.

FIG. 12 is a flow chart of the logic sequence of the MPPT control algorithm, showing, for the considered example, also how the output voltage of the DC-DC converter 18 is limited.

The depicted flow chart highlights the comparison (step 52) that is carried out between the current digital value $P(t_n)$ of the power yield of the string of cells of the panel at the n-th sampling instant, with the value at the preceding sampling instant $P(t_{n-1})$ in order to obtain the sign.

In the illustrated example, the MPPT algorithm carries out the updating by stepwise incrementing or decrementing (step 54) by a pre-established quantity the digital control value ($V_{ref}$) to be sent to the DAC 40 that will convert it into a reference voltage applied to an input of the PWM drive comparator 42 of the DC-DC controller 32 that controls the power switch $SW_1$ of the DC-DC converter 18.

In the exemplary algorithm of FIG. 12, updating of the logic control value of the voltage $V_{ref}$ is conditioned as follows:

the value of the variable SIGN may be either +1 (for an increment of $V_{ref}$) and −1 (for a decrement of $V_{ref}$);

the algorithm will keep unchanged the sign of the correction (increment or decrement) of the value $V_{ref}$ until the condition $P(t_n)>P(t_{n-1})$ is verified, in other words until an increase of the power yielded from the string of cells is detected.

When a reduction of the power $P(t_n)<P(t_{n-1})$ is detected, the sign of the variable SIGN switches, thus inverting the sign of updating (decrement or increment) of $V_{ref}$ (step 56).

In the illustrated exemplary embodiment, updating of the control value $V_{ref}$ in function of the result of the MPPT algorithm is conditioned by the control exerted on the regulated output voltage, represented by the block OUTPUT VOLTAGE LIMITATION, according to the following parameters and rules:

threshold $V_{on-th}$ for stabilizing the output voltage by forcing a missed update of the value of the control signal $V_{ref}$ when the output voltage surpasses the threshold;

maximum safety threshold $V_{on-max}$, that may typically be fixed at a value $V_{o-max}=1.1*V_{o-th}$, upon the attainment of which the value $V_{ref}$ is forced to a certain minimum pre-established value such to speed up the decrement of the output voltage of the inverter.

Figure 13:
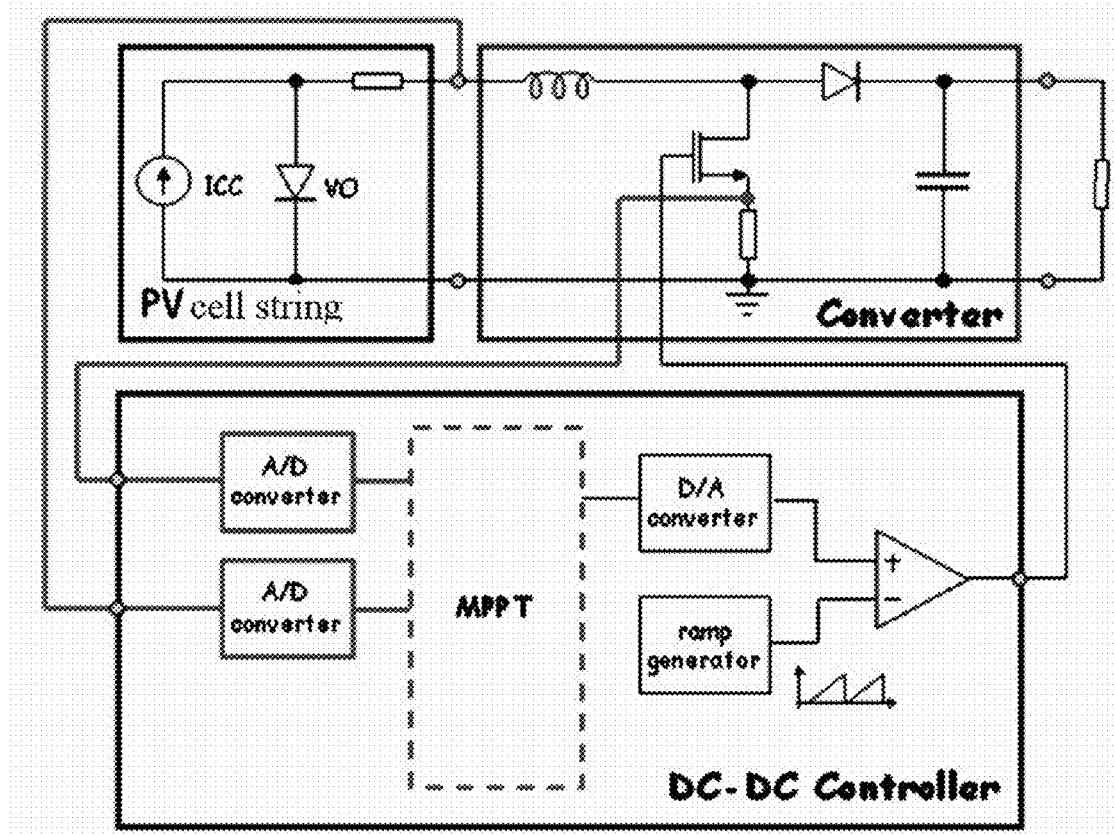
FIGS. 13 and 14 are basic circuit structures wherein in the former the monitoring lines of the input current and voltage are highlighted for calculating the instantaneous power supplied by a group of cells of the panel and in the latter there is also a line for monitoring the output voltage for implementing a voltage limitation loop.
Figure 14:
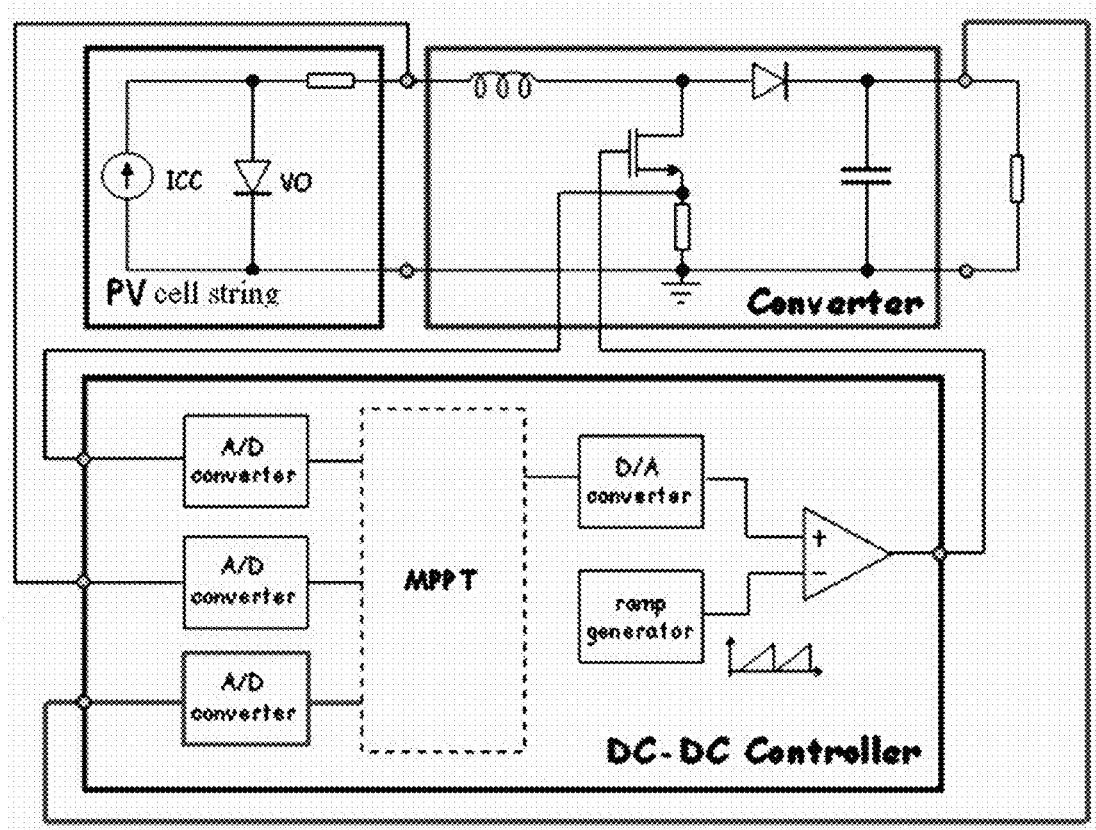

In the exemplary circuit diagrams of FIG. 13 only the monitoring lines of the current and of the voltage produced by the string of cells in series are highlighted. In the exemplary circuit diagram of FIG. 14 also a third monitoring line of the output voltage for implementing relative stabilization thresholds is shown.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A photovoltaic energy conversion system, comprising:
    a plurality of multi-cellular photovoltaic panels, each panel including:
        a plurality of groups of photovoltaic cells structured to generate voltages, respectively;
    a DC bus coupled to the plurality of multi-cellular photovoltaic panels; and
    a plurality of DC-DC converters formed on each photovoltaic panel, each converter having inputs coupled to a respective group of photovoltaic cells on the photovoltaic panel and outputs coupled to the DC bus, each converter structured to individually regulate the voltage generated by the respective group of photovoltaic cells; each converter including a power switch and a control logic circuit structured to process monitored values of at least one of electrical input and output parameters and execute an algorithm of maximum power point tracking of the corresponding group of photovoltaic cells of the photovoltaic panel to produce a drive control signal to control the power switch of the DC-DC converter, each converter structured to perform individual regulation that includes:
        comparing an output power of the corresponding group of photovoltaic cells at a current sampling instant with an output power of the corresponding group of photovoltaic cells at a preceding sampling instant; and
        updating, based on the comparing, a tracked reference value of a working point of maximum electrical power yield of the corresponding group of photovoltaic cells, by incrementing or decrementing by a fixed quantity a reference signal that is applied to a input of a drive comparator of the corresponding DC-DC converter.

2. The conversion system of claim 1, further comprising a DC-AC converter having an input connected to said DC buses of the multi-cellular photovoltaic panels.

3. The conversion system of claim 2, further comprising an anti-islanding control system coupled to the DC-AC converter and structured to analyze a public grid voltage for recognizing any programmed or accidental grounding or interruption on a public distribution grid and of electrically isolating the conversion system from the public grid.

4. The conversion system of claim 1, wherein said DC-DC converters of each multi-cellular panel are step-up or boost converters and are each structured to increase an output voltage in respect to the voltage generated by the corresponding group, which voltage corresponds to the sum of voltages individually generated by the photovoltaic cells of the corresponding group.

5. The conversion system of claim 1, wherein said DC-DC converters are boost, buck or buck-boost converters and are structured to stabilize an output voltage at a smaller or larger value than the voltage generated by the corresponding group, which voltage corresponds to the sum of individual voltages generated by the photovoltaic cells of said group.

6. The conversion system of claim 1, wherein the control logic circuit of each DC-DC converter is realized via hardware and includes:
    logic circuitry structured to generate a digital control value;
    a digital-to-analog converter structured to convert the digital control value into an analog reference signal; and a PWM drive comparator having an input coupled to receive the analog reference signal and an output coupled to the power switch of the DC-DC converter.

7. The conversion system of claim 6, wherein each DC-DC converter includes a multiplier having an output coupled to said logic circuitry and structured to produce a digital value of power yielded from the group of cells at a sampling instant, the multiplier being structured to produce the digital value by multiplying instantaneous values of current delivered by the corresponding group of photovoltaic cells by the voltage produced by the corresponding group of photovoltaic cells.

8. The conversion system of claim 7, wherein, for each DC-DC converter, the drive comparator of the DC-DC converter is structured to control the power switch of the DC-DC converter in voltage mode by comparing the analog reference signal with a ramp signal of a frequency, implementing a constant frequency PWM control.

9. The conversion system of claim 7, wherein the logic circuitry of each DC-DC converter is structured to continuously update a tracked reference value of a working point of maximum electrical power yield of the corresponding group of photovoltaic cells, by incrementing or decrementing by a fixed quantity said reference signal that is applied to the input of said drive comparator of the DC-DC converter, in function of a comparison of an output power of the corresponding group of photovoltaic cells at a current sampling instant with an output power of the corresponding group of photovoltaic cells at a preceding sampling instant.

10. The conversion system of claim 9, wherein, for each DC-DC converter, the output of the DC-DC converter is coupled to an input of the logic circuitry of the DC-DC converter, which logic circuitry is structured to use a current digital value of the output voltage of the DC-DC converter to limit to a pre-established threshold the output voltage by conditioning an execution or a non-execution of said incrementing or decrementing operation.

11. The conversion system of claim 9, wherein, for each DC-DC converter, the output of the DC-DC converter is coupled to an input of the logic circuitry of the DC-DC converter, which logic circuitry is structured to use a current digital value of the output voltage of the DC-DC converter to establish a maximum safety threshold of the output voltage, upon attainment of which said reference value is reduced to a pre-established value.

12. The conversion system of claim 1, wherein the control logic circuit of each DC-DC converter includes a variable frequency PWM control circuit structured to control the power switch of the DC-DC converter in current mode.

13. The conversion system of claim 1, wherein the control logic circuit of each DC-DC converter includes a variable frequency PWM control circuit structured to control the power switch of the DC-DC converter in voltage mode.

14. A multi-cellular photovoltaic panel, comprising:
connection terminals structured to connect the panel to an external circuit;
an inner DC bus coupled to the connection terminals;
a plurality of groups of photovoltaic cells structured to generate voltages, respectively;
a plurality of DC-DC converters formed on the panel, each converter having inputs coupled to a respective group of photovoltaic cells and outputs coupled to the DC bus, each converter structured to regulate voltage generated by the respective group of photovoltaic cells to which it is coupled, each DC-DC converter including:
a power switch; and
a control logic circuit structured to process monitored values of electrical input or output parameters and execute an algorithm of maximum power point tracking of the corresponding group of photovoltaic cells of the panel to produce a drive control signal to control the power switch of the DC-DC converter, wherein the control logic circuit of each DC-DC converter is realized via hardware and includes:
logic circuitry structured to generate a digital control value;
a digital-to-analog converter structured to convert the digital control value into an analog reference signal; and
a PWM drive comparator having an input coupled to receive the analog reference signal and an output coupled to the power switch of the DC-DC converter,
wherein each DC-DC converter includes a multiplier having an output coupled to said logic circuitry and structured to produce a digital value of power yielded from the group of cells at a sampling instant, the multiplier being structured to produce the digital value by multiplying instantaneous values of current delivered by the corresponding group of photovoltaic cells by the voltage produced by the corresponding group of photovoltaic cells.

15. The multi-cellular photovoltaic panel of claim 14, wherein each DC-DC converter includes an output diode and the power switch of each DC-DC converter is a MOS switch having an integrated structure that defines an intrinsic diode structured to provide, together with the output diode of the DC-DC converter, a by-pass path for current in case of underexposure or electrical interruption of one or of all the photovoltaic cells of the corresponding group.

16. The multi-cellular photovoltaic panel of claim 14, wherein said plurality of DC-DC converters are physically realized on a printed circuit board accommodated in a connection terminals box present on a backside of the photovoltaic panel.

17. A photovoltaic energy conversion method, comprising:
producing photovoltaic energy using a plurality of multi-cellular photovoltaic panels, each panel having at least two groups of photovoltaic cells, each group of photovoltaic cells having a DC-DC converted coupled thereto, the producing including:
generating respective voltages from respective groups of photovoltaic cells on each photovoltaic panel; and
individually regulating the respective voltages, the regulating including:
DC-DC converting the voltages using the DC-DC converters respectively coupled to the groups of photovoltaic cells; and
processing monitored values of at least one of electrical input and output parameters and executing an algorithm of maximum power point tracking of said respective group of photovoltaic cells of the panel to produce a drive control signal that controls a power switch of a corresponding one of the DC-DC converters, wherein the individually regulating includes:
comparing an output power of the corresponding group of photovoltaic cells at a current sampling instant with an output power of the corresponding group of photovoltaic cells at a preceding sampling instant; and
updating, based on the comparing, a tracked reference value of a working point of maximum electrical power yield of the corresponding group of photovoltaic cells, by incrementing or decrementing by a fixed quantity a reference signal that is applied to a input of a drive comparator of the corresponding DC-DC converter.

18. The method of claim 17, wherein, for each DC-DC converter, the output of the DC-DC converter is coupled to an input of the logic circuitry of the DC-DC converter, which logic circuitry is structured to use a current digital value of the output voltage of the DC-DC converter to establish a maximum safety threshold of the output voltage, upon attainment of which said reference value is reduced to a pre-established value.

19. The method of claim 17, including controlling the power switch of each DC-DC converter in current mode using a variable frequency PWM control circuit.

20. A photovoltaic energy conversion system, comprising:
a plurality of multi-cellular photovoltaic panels each including:
a plurality of groups of photovoltaic cells structured to generate voltages, respectively;
a DC bus; and
a plurality of DC-DC converters having respective inputs coupled respectively to the groups of photovoltaic cells and respective outputs connected to said DC bus, each converter being structured to regulate the voltage generated by a corresponding group of the groups of photovoltaic cells; each converter including a power switch and a control logic circuit structured to process monitored values of at least one of electrical input and output parameters and execute an algorithm of maximum power point tracking of said corresponding group of photovoltaic cells of the panel for producing a drive control signal for controlling the power switch of the DC-DC converter;
wherein the control logic circuit of each DC-DC converter is realized via hardware and includes:
logic circuitry structured to generate a digital control value;
a digital-to-analog converter structured to convert the digital control value into an analog reference signal; and
a PWM drive comparator having an input coupled to receive the analog reference signal and an output coupled to the power switch of the DC-DC converter; and
wherein each DC-DC converter includes a multiplier having an output coupled to said logic circuitry and structured to produce a digital value of power yielded from the group of cells at a sampling instant, the multiplier being structured to produce the digital value by multiplying instantaneous values of current delivered by the corresponding group of photovoltaic cells by the voltage produced by the corresponding group of photovoltaic cells.

21. The conversion system of claim 20, wherein said DC-DC converters of each multi-cellular panel are step-up or boost converters and are each structured to increase an output voltage in respect to the voltage generated by the corresponding group, which voltage corresponds to the sum of voltages individually generated by the photovoltaic cells of the corresponding group.

22. The conversion system of claim 20, wherein said DC-DC converters are boost, buck or buck-boost converters and are structured to stabilize an output voltage at a smaller or larger value than the voltage generated by the corresponding group, which voltage corresponds to the sum of individual voltages generated by the photovoltaic cells of said group.

23. The conversion system of claim 20, wherein, for each DC-DC converter, the drive comparator of the DC-DC converter is structured to control the power switch of the DC-DC converter in voltage mode by comparing the analog reference signal with a ramp signal of a frequency, implementing a constant frequency PWM control.

24. The conversion system of claim 20, wherein the logic circuitry of each DC-DC converter is structured to continuously update a tracked reference value of a working point of maximum electrical power yield of the corresponding group of photovoltaic cells, by incrementing or decrementing by a fixed quantity said reference signal that is applied to the input of said drive comparator of the DC-DC converter, in function of a comparison of an output power of the corresponding group of photovoltaic cells at a current sampling instant with an output power of the corresponding group of photovoltaic cells at a preceding sampling instant.

25. The conversion system of claim 24, wherein, for each DC-DC converter, the output of the DC-DC converter is coupled to an input of the logic circuitry of the DC-DC converter, which logic circuitry is structured to use a current digital value of the output voltage of the DC-DC converter to limit to a pre-established threshold the output voltage by conditioning an execution or a non-execution of said incrementing or decrementing operation.

26. The conversion system of claim 24, wherein, for each DC-DC converter, the output of the DC-DC converter is coupled to an input of the logic circuitry of the DC-DC converter, which logic circuitry is structured to use a current digital value of the output voltage of the DC-DC converter to establish a maximum safety threshold of the output voltage, upon attainment of which said reference value is reduced to a pre-established value.

27. The conversion system of claim 20, wherein the control logic circuit of each DC-DC converter includes a variable frequency PWM control circuit structured to control the power switch of the DC-DC converter in current mode.

28. The conversion system of claim 20, wherein the control logic circuit of each DC-DC converter includes a variable frequency PWM control circuit structured to control the power switch of the DC-DC converter in voltage mode.

* * * * *